April 25, 1944.   K. CYRON ET AL   2,347,542
GIRDER FOR AIRCRAFT STRUCTURE
Filed May 16, 1939   2 Sheets-Sheet 1
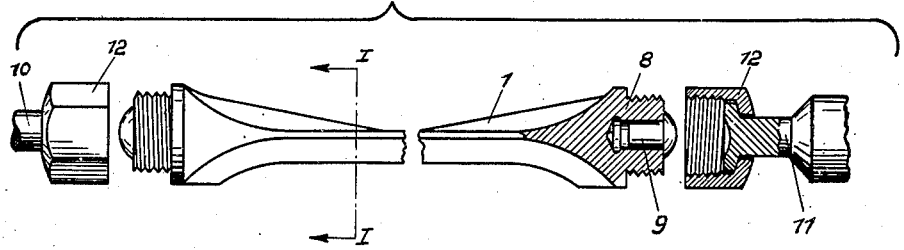
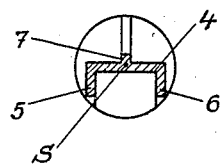
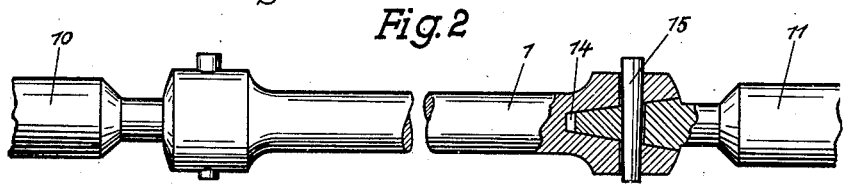
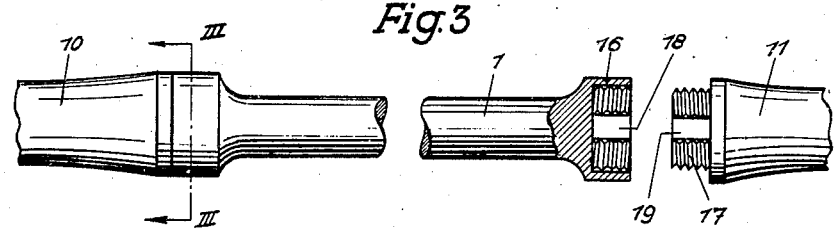
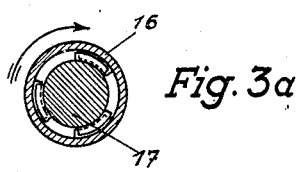
Inventors:
Kurt Cyron
Erich Wessel
by
Attorney.

Patented Apr. 25, 1944

2,347,542

UNITED STATES PATENT OFFICE 2,347,542

GIRDER FOR AIRCRAFT STRUCTURE

Kurt Cyron and Erich Wessel, Dessau, Germany; vested in the Alien Property Custodian Application May 16, 1939, Serial No. 273,879
In Germany May 17, 1938

1 Claim. (Cl. 244—117)

The present invention relates to the design of girders or spars which run from the one side of an aircraft structure to the other and consist of a plurality of longitudinal parts to be connected with one another.

Such girders are used in aircraft, for instance in the wings, tail groups, and the like. It is necessary to build these girders of several parts in view of joints in the structure. Such joints are caused, e. g. by the transverse subdivision of the wing because of the insertion of the fuselage, or by the arrangement of the so-called intermediate pieces of the wing. The portion of the girder located between the points of separation must be provided on both sides with attachment members to which the other parts belonging to the girder may be attached.

In order to make ourselves fully understood, the term "longitudinal member" will be used in the specification hereinafter and in the claim to denote those portions or members of a girder which in a conventional girder type are located near the top and the bottom of the girder when the latter is in a horizontal position, and which usually are farthest remote from both sides of the neutral zone when the girder is subject to bending loads; and the term "longitudinal element" is to indicate one of the alined parts of which a "longitudinal member" subdivided transversely of its longitudinal extension is composed.

In the conventional design and construction of the afore-mentioned joints or points of separation, the longitudinal members of a girder are composed of a plurality, in general three, longitudinally alined elements, and the attachment members are so arranged on the longitudinal members of the girder that to each end of the middle element of a longitudinal member an attachment member is riveted which is separately made and provided with a threading. For this purpose, every attachment member must have a flange-like collar or projection to be fixed to the middle one of the longitudinal elements for effecting the connection. The longitudinal elements of the other girder parts to be attached to the longitudinal elements of the middle girder parts are secured to the attachment members by means of cap units. The design of this type shows, on each longitudinal member of a girder, two fields of rivets the elimination of which is highly desirable since they weaken both the longitudinal members and the attachment members. Moreover, the attachment members riveted to the longitudinal members of the conventional girder type must have a certain length in order to safeguard the necessary strength. This is particularly inconvenient in the case of a tubular design of the middle element of a longitudinal member into which the comparatively long flange-like portions of the attachment members, serving for the riveting must be shoved from both sides. In that event, the middle longitudinal member must have a certain minimum length which makes it hardly possible to bridge very shortly distanced points of separation in this manner. For this reason the attachment members have been welded to the elements of the longitudinal members in another well-known structure. However, this structure requires two welded regions the elimination of which is desirable from an economic view point as well as from the view point of strength, quite aside from the fact that the welding causes a further increase in the consumption of material.

The purpose of the present invention is to eliminate these drawbacks. The invention contemplates to provide a longitudinal member of a girder, in which the mentioned difficulties and drawbacks are avoided by the arrangement of the attachment members on the longitudinal member, and in which, moreover, material, weight and production costs can be saved, and the strength and rigidity of the connection of the longitudinal elements can be very considerably increased.

According to the invention, the attachment members are united with the middle element of a longitudinal member to a one-piece body so that any riveting and welding is avoided. The design of the attachment bosses or heads, and that of the longitudinal member as well as the connection of the longitudinal member elements with each other may be optional, screw connections, bolt connections, or bayonet couplings being suited to the purpose. The longitudinal member proper is preferably designed as a so-called open section, having a cavity open on a portion of its circumference. The cross section of the member, which may be e. g. U- or T-shaped passes gradually over, at the ends of the longitudinal elements composing the longitudinal member into the thickened round shape of the connection head, advantageously in such a manner that the center of gravity of the cross-section lies approximately on the axis of the head which may be threaded.

Further objects and details of the invention will be apparent from the description hereinafter and the accompanying drawings illustrating three different embodiments thereof by way of example. In the drawings:

Fig. 1 shows an open section, middle element of a longitudinal member.

Fig. 1a is a cross-section along line 1a—1a of Fig. 1.

Fig. 2 is a round section longitudinal element with bolt connection.

Fig. 3 shows likewise a round section with a thread bayonet coupling, and

Fig. 3a is a cross-section along line 3a—3a in Fig. 3.

Figure 4:
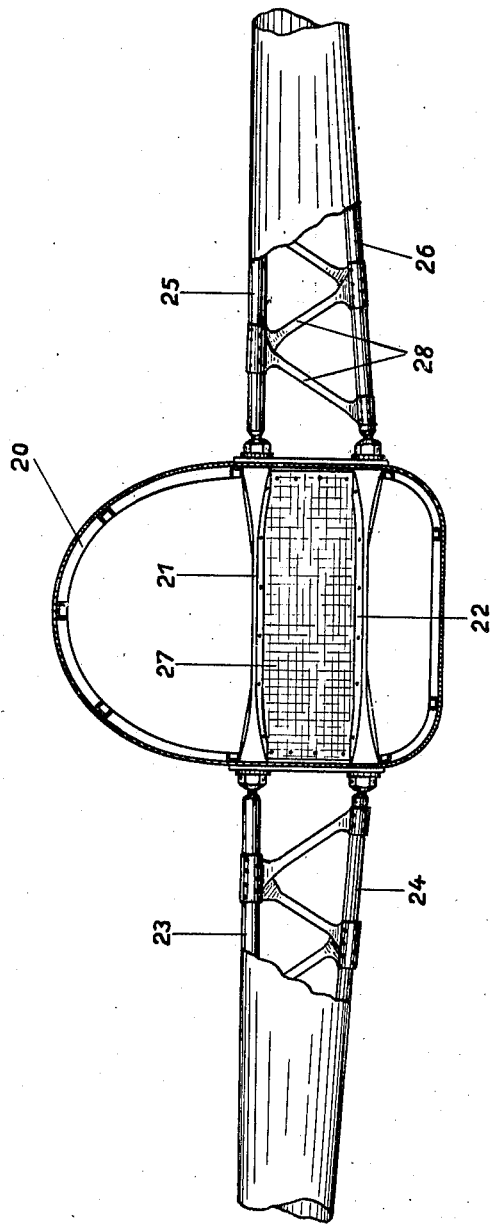
Fig. 4 shows the whole arrangement of the girder.

According to Fig. 1 and 1a the longitudinal member comprises the middle element 1 and the lateral elements 10, 11. Element 1 has a flat U-shape in cross-section, that is to say it has a web 4 with lateral flanges 5, 6 and 7. Towards the ends of the longitudinal element 1, this profile or section passes gradually over into the round form of connection or attachment heads which have a cylindrical boss and a thread carrying extension 8. The attachment head may have a hole or recess, with the object of reducing the weight into which a mushroom-like piece 9 is inserted. The attachment heads of the longitudinal element 1 may be connected with the longitudinal elements 10, 11. The end portion of each of the latter has a hollow ball shape so that its interior surface snugly fits the arch or camber of the piece 9. The nuts 12 provided on the end portions of the longitudinal elements 10, 11 may be screwed upon the threading of the attachment heads and thus hold the longitudinal elements firmly together. The cross-section of the longitudinal elements has such a position relatively to the attachment heads that its center of gravity S (Fig. 1a) falls on the axis of the connection heads.

In place of the screw connection, a bolt connection is shown in the embodiment of Fig. 2. In the two lateral ends of the longitudinal element 1 tapered recesses 14 are provided in the axial direction. The end portions of the longitudinal elements 10, 11 to be attached are shaped as truncated cones in such a manner that they may be pushed into the recesses 14. Both parts, viz. the attachment head of element 1 and the end portion of the element 11 to be attached to element 1, have holes running perpendicular to their axes. When the longitudinal element to be attached is inserted into the attachment head, said holes are brought to register and are engaged by a connection body 15 such as a bolt, wedge or the like, driven into the attachment head of the middle element 1 in a diametrical direction.

According to Figs. 3 and 3a, the attachment head of the longitudinal element 1 is designed as an interiorly threaded boss 16 and the end portion of the longitudinal element to be attached thereto is designed as a screw stud 17. Both the interiorly threaded boss and the screw stud have recesses 18 and 19 in their threaded portions which make it possible to push or telescope them readily and without interference by the threaded portions, into each other in the axial direction until the screw body 17 comes to a stop on the bottom of the interiorly threaded boss 16 on the longitudinal element 1. Upon reaching this end position, locking may be effected by an axial turning in the manner conventional in bayonet locks.

In Fig. 3a the interiorly threaded boss 16 of the longitudinal element 1 is shown in cross-section, and also the screw body 17 of the longitudinal element 11, the body 17 being turnable in the boss 16 in the direction of the arrow for the purpose of locking.

In Fig. 4 the whole arrangement of the girder unit is illustrated, which runs from the one side of an aircraft structure to the other and consists of a plurality of longitudinal parts connected with one another. On account of the insertion of the fuselage 20 the girder is subdivided transversely of its longitudinal extension and comprises the longitudinal elements 21, 22, 23, 24, 25, 26.

In the middle part of the longitudinal member which is embraced by the fuselage 20 the longitudinal elements 21 and 22 are joined together by means of a sheet metal plate 27 forming the web of the girder.

In the outer portions the longitudinal elements 23, 24 and 25, 26 are joined together by diagonal bracing members 28. The longitudinal elements 21 and 22 lying within the middle part embraced by the fuselage 20 are illustrated in detail in Figs. 1–3a of the drawings.

We claim:

An airplane girder comprising a plurality of longitudinal elements, one of which being a middle element, said middle element comprising a middle portion of a channel-shaped cross-section and heads at its ends so shaped as to receive therewith an end of another one of said elements to be attached thereto, said heads being made in one piece with said middle portion and having a substantially circular cross-section whose periphery projects outwardly beyond the contour of the cross-section of the middle portion, the channel-shaped cross-section of the middle portion gradually passing over into the cross-section of said heads, and the center of gravity of the channel-shaped cross-section lying substantially on the axes of said heads.

KURT CYRON.
ERICH WESSEL.